United States Patent
Xu et al.

(10) Patent No.: US 9,500,833 B1
(45) Date of Patent: Nov. 22, 2016

(54) OPTICAL FIBER MODULE RACK SYSTEM

(71) Applicant: ALLIANCE FIBER OPTIC PRODUCTS, INC., New Taipei (TW)

(72) Inventors: Gang Xu, Guangdong Province (CN); Kuo-Fu Hsu, New Taipei (TW); Shuang-Qiang Liu, Guangdong Province (CN); Yao Li, Newark, CA (US)

(73) Assignee: Alliance Fiber Optic Products, Inc., Tu-Chen District, New Taipei (TW)

( * ) Notice: Subject to any disclaimer, the term of this patent is extended or adjusted under 35 U.S.C. 154(b) by 0 days.

(21) Appl. No.: 14/936,852

(22) Filed: Nov. 10, 2015

Related U.S. Application Data (60) Provisional application No. 62/179,392, filed on May 7, 2015.

(51) Int. Cl.
 *G02B 6/44* (2006.01)

(52) U.S. Cl.
 CPC ........... *G02B 6/4455* (2013.01); *G02B 6/4446* (2013.01); *G02B 6/4452* (2013.01)

(58) Field of Classification Search
 CPC .................................................. G02B 6/4455
 See application file for complete search history.

(56) References Cited

U.S. PATENT DOCUMENTS

| | | | | |
|---|---|---|---|---|
| 2010/0322579 A1* | 12/2010 | Cooke | ................. | G02B 6/4452 |
| | | | | 385/135 |
| 2010/0322582 A1* | 12/2010 | Cooke | ................. | G02B 6/4455 |
| | | | | 385/135 |
| 2014/0003782 A1* | 1/2014 | Blackwell, Jr. | ...... | G02B 6/4455 |
| | | | | 385/135 |
| 2016/0062068 A1* | 3/2016 | Giraud | ................ | G02B 6/3825 |
| | | | | 385/135 |

* cited by examiner

*Primary Examiner* — Jerry Rahll
(74) *Attorney, Agent, or Firm* — Dinsmore & Shohl LLP (57) ABSTRACT

An optical fiber module rack system includes a rack including multiple accommodation chambers, opposing first and second sliding grooves located in each accommodation chamber, and a stop block located at each of opposing front and rear ends of each first sliding groove, and optical fiber storage boxes each including a box body mounted in one respective accommodation chamber, a first optical fiber module and second optical fiber module mounted in opposing front and rear sides of box body and connected together, two guide rails located at two opposite lateral sidewalls of box body and respectively coupled to first sliding groove and second sliding groove of respective accommodation chamber, two elastic retainer strips respectively extended from opposite ends of one guide rail and provided with a respective hook block for engagement with one respective stop block, and elongated press member extended from other guide rail for pressing by external force to disengage hook blocks from respective stop blocks for allowing removal of optical fiber storage box out of respective accommodation chamber.

12 Claims, 12 Drawing Sheets

OPTICAL FIBER MODULE RACK SYSTEM

This reference is based on Provisional Application Ser. No. 62/179,392, filed on May 7, 2015, currently pending.

BACKGROUND OF THE INVENTION

1. Field of the Invention

The present invention relates to optical fiber technology and more particularly, to an optical fiber module rack system, which comprises a rack having a plurality of accommodation chambers defined within a base panel and separated by partition plates, and a plurality of optical fiber storage boxes each comprising a hollow box body mounted in one respective accommodation chamber, a first optical fiber module and a second optical fiber module respectively mounted in opposing front and rear sides of the hollow box body, two guide rails respectively located at two opposite lateral sidewalls of the hollow box body and respectively coupled to a first sliding groove and a second sliding groove in the respective accommodation chamber, two elastic retainer strips respectively extended from two opposite ends of one guide rail, and an elongated press member extended from one end of the other guide rail.

2. Description of the Related Art

With rapid development of modern communications technology and the Internet, data centers and telecommunications providers are trying hard to provide relative equipment having the characteristics of high density, high transmission speed, high capacity and high intelligence. In order to meet the demands for faster data transmission speed, smaller footprint and lower energy consumption, the physical infrastructure of cabling system has been receiving more attention than ever before. Cable and optical fiber transmission systems are two important transmission media in a data center cabling system. When compared with a cable transmission system, an optical fiber transmission system has the advantages of wider bandwidth, faster transmission speed, longer transmission distance, thinner dimension, stronger anti-electromagnetic interference and better confidentiality. Optical fiber transmission system is bound to become the hottest trend in the future.

Further, a fiber optic adapter is a component widely used in optical fiber transmission systems for the connection of two optical fiber connectors at two fiber optic cables to mechanically couple and align the cores of fibers so that an optical signal can be maximally coupled from the fiber optic cable at the transmitter side to the fiber optic cable at the receiver side. A variety of optical fiber connectors are commercially available, but SC, LC and ST connectors are the most common types of connectors on the market. In order to reduce space occupation and to satisfy the requirements for high density installation, high transmission rate and high operating efficiency, multi-fiber (e.g., MPO/MTP) connectors such as MPO (Multifiber Push-On)/MTP (Multifiber Termination Push-on) connectors are used to replace larger, older styles (e.g., SC), allowing more fiber ports per unit of rack space. High density MTP/MPO trunk cables with at least 12 fibers or up to 24 fibers in a single cable. When mounting the optical fiber connectors of two fiber optic cables in a fiber optic adapter for connection, the polarity and connection compatibility between the two fiber optic cables must be accurately controlled to prevent optical signal transmission failure.

Regular rack mount optical fiber distribution panels include 1RU, 2RU, 4RU and 8RU. Basically, a 1RU rack has a width of 19 inches and a height of 1.72 inches, and equipped with multiple high density optical fiber modules therein in a detachable manner. One single MPO optical fiber module is adapted for converting a 12-core MPO connector into 12 single-core optical fiber connectors. Therefore, the rack has sockets arranged on the front panel thereof for the installation of 12 or 24 single-core optical fiber connectors, and one or two sockets arranged on the back panel thereof for the connection of one or two MPO connectors. A MPO optical fiber module has multiple optical fiber leads arranged therein for connecting the sockets at the front panel of the rack to the sockets at the back panel. After installation of a MPO optical fiber module in an optical fiber distribution panel, LC or SC optical fiber connectors can be selectively installation. The use of MPO optical fiber modules in a data center or computer room provides the advantages of flexible configuration and management. When wishing to change the quantity or positions of equipments or optical fiber connectors, the MPO optical fiber modules facilitate adding, removing or replacing the optical fiber connectors.

However, in order to satisfy MPO optical fiber module spatial arrangement requirements under the limitation of the specifications of a standard 1RU rack and to effectively solve the problem of insufficient number of transmission channels due to bandwidth restrictions, optical fiber module rack system manufacturers need to consider how to install a relatively larger number of optical fiber connectors in a limited installation space and how to facilitate MPO optical module mounting and dismounting convenience. Conventional techniques of mounting MPO optical fiber modules in a rack need to use a tool for driving screws into respective screw holes. Mounting MPO optical fiber modules in a rack or dismounting the MPO optical fiber modules from the rack in this manner requires much labor and time, thereby increasing the cost. Further, a data center or computer room has a large number of rack mount optical fiber distribution panels. Therefore, it is desirable to provide an optical fiber module rack system, which requires less installation space, facilitates mounting and dismounting of MPO optical fiber modules for convenient replacement and maintenance, and significantly saves installation labor and time.

SUMMARY OF THE INVENTION

The present invention has been accomplished under the circumstances in view. It is therefore the main object of the present invention to provide an optical fiber module rack system, which comprises a rack and a plurality of optical fiber storage boxes. The rack comprises a base panel, a plurality of accommodation chambers defined within the base panel and separated by partition plates, opposing first and second sliding grooves located in each accommodation chamber, and a stop block located at each of opposing front and rear ends of each first sliding groove. The optical fiber storage boxes each comprise a box body mounted in one respective accommodation chamber, a first optical fiber module mounted in a front side of the box body, a second optical fiber module mounted in an opposing rear side of the box body and connected to the first optical fiber module, two guide rails located at two opposite lateral sidewalls of the box body and respectively coupled to the first sliding groove and second sliding groove of the respective accommodation chamber, two elastic retainer strips respectively extended from opposite ends of one guide rail and provided with a respective hook block for engagement with one respective stop block, and an elongated press member extended from the other guide rail for pressing by an external force to disengage the hook blocks from the respective stop blocks for allowing removal of the optical fiber storage box out of the respective accommodation chamber. When inserting the guide rails of the box body into the first sliding groove and the second sliding groove, the hook blocks of the elastic retainer strip will be moved over the respective stop blocks at the front and rear sides of the respective guide rail and then hooked up with the respective stop blocks to hold the respective optical fiber storage box firmly in the respective accommodation chamber of the rack. Further, by means of pressing the elongated press member at the other guide rail with one single hand, the hook blocks are disengaged from the respective stop blocks, allowing removal of the optical fiber storage box out of the respective accommodation chamber. Thus, the invention facilitates quick mounting and dismounting of the optical fiber storage boxes without tools, saving much labor and time costs, increasing fabrication efficiency and assuring a high level of structural stability.

Further, the first optical fiber module and the second optical fiber module of each optical fiber storage box are exposed out of the openings in the opposing front and rear sides of the respective accommodation chamber of the rack. The first optical fiber module comprises a plurality of first sockets for the connection of 24 single-core LC or SC optical fiber connectors. The second optical fiber module is connected to the first optical fiber module, comprising a plurality of second sockets respectively provided for the connection of 12-core MPO optical fiber connectors. Thus, 8 optical fiber storage boxes are mounted in the respective accommodation chambers of the rack to meet 1RU rack specifications for the connection of total 192 cores of LC or SC optical fiber connectors. Thus, each optical fiber storage box of the invention allows installation of a large amount of optical fiber connectors at a relatively higher density.

DETAILED DESCRIPTION OF THE PREFERRED EMBODIMENT

Referring to FIGS. 1-5, an oblique front elevational view of an optical fiber module rack system, an oblique rear elevational view of the optical fiber module rack system, an exploded view of the optical fiber module rack system, an oblique top elevational view of one optical fiber storage box of the fiber module rack system and an oblique bottom elevational view of one optical fiber storage box of the optical fiber module rack system are shown. The optical fiber module rack system comprises a rack 1 of 1RU (rack unit), and a plurality of optical fiber storage boxes 2 mounted in the rack 1 in a parallel manner.

The rack 1 comprises a base panel 11 having two parallel upright side panels 111 at two opposite lateral sides thereof, a plurality of partition plates 12 arranged on the base panel 11 in a parallel manner between the upright side panels 111, a plurality of accommodation chambers 10 defined between the upright side panels 111 and separated from one another by the partition plates 12 each having an opening 101 located in each of opposing front and rear sides thereof, a first sliding groove 121 and a second sliding groove 122 respectively disposed at two opposite sidewalls of each accommodation chamber 10 at different elevations and extended to the openings 101 in the front and rear sides of the associating accommodation chamber 10, a stop block 123 located at each of opposing front and rear ends of each first sliding groove 121 (see FIG. 6), each stop block 123 defining a beveled outer guide surface 1231 at an outer side and a stepped inner abutment surface 1232 at an inner side, and a cover panel 13 supported on the partition plates 12 over the accommodation chambers 10 and affixed to the upright side panels 111 with, for example, screws. The optical fiber storage boxes 2 are respectively mounted in the accommodation chambers 10 of the rack 1. Each optical fiber storage box 2 comprises a hollow box body 21 defining a bottom wall, a top wall, a front wall, a rear wall and two opposite sidewalls, a storage chamber 20 defined in the hollow box body 21 (see FIG. 6), a plurality of mounting holes 201 respectively located in the opposing front and rear walls of the hollow box body 21 in communication with the storage chamber 20, a first optical fiber module 22 mounted in the mounting holes 201 in the front wall of the hollow box body 21, a second optical fiber module 23 mounted in the mounting holes 201 in the rear wall of the hollow box body 21 for connection to the first optical fiber module 22, two guide rails 211 respectively located at the two opposite sidewalls of the hollow box body 21 at different elevations and extended along the length thereof, two elastic retainer strips 212 respectively outwardly extended from opposing front and rear ends of one guide rail 211 and suspending outside the hollow box body 21, each elastic retainer strip 212 comprising a conical finger tip 2121 at the distal end thereof and a plurality of wave-shaped anti-slip grooves 2122 located at an outer side thereof adjacent to the conical finger tip 2121, two hook blocks 213 respectively located at the elastic retainer strips 212 adjacent to the associating guide rail 211 at an outer side, each hook block 213 defining a beveled pushing surface 2131 that slopes downwardly inwards toward the associating guide rail 211 and a stepped engagement surface 2132 that faces toward the conical finger tip 2121, and an elongated press member 214 of length relatively shorter than the elastic retainer strips 212 outwardly extended from a front end of the other guide rail 211. The elongated press member 214 comprises a conical finger tip 2141 located at a distal end thereof, a plurality of wave-shaped anti-slip grooves 2142 located at an outer side thereof adjacent to the conical finger tip 2141, and a reinforcing rib 2143 located at an inner side thereof and horizontally extended to the hollow box body 21 (see FIG. 4 and FIG. 10) to reinforce the structural strength of the elongated press member 214 against deformation and breaking.

Figure 1:
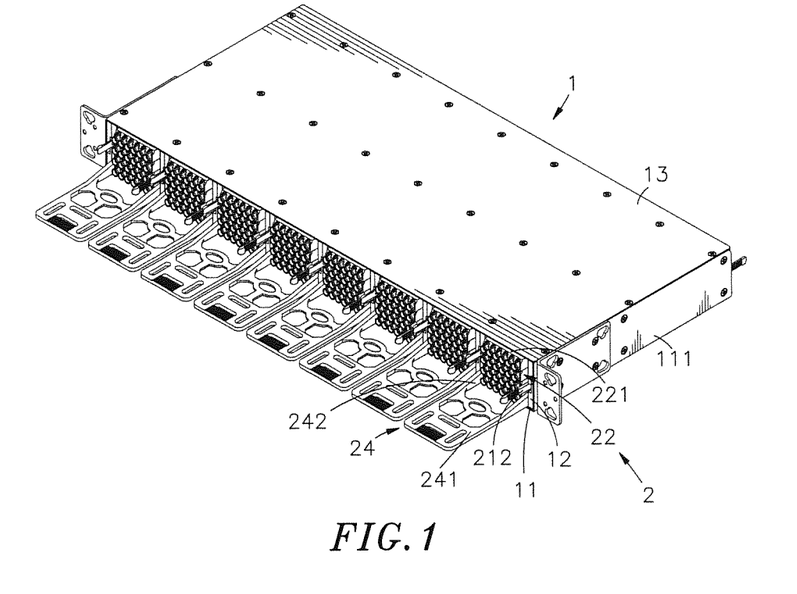
FIG. 1 is an oblique front elevational view of an optical fiber module rack system in accordance with the present invention.
Figure 2:
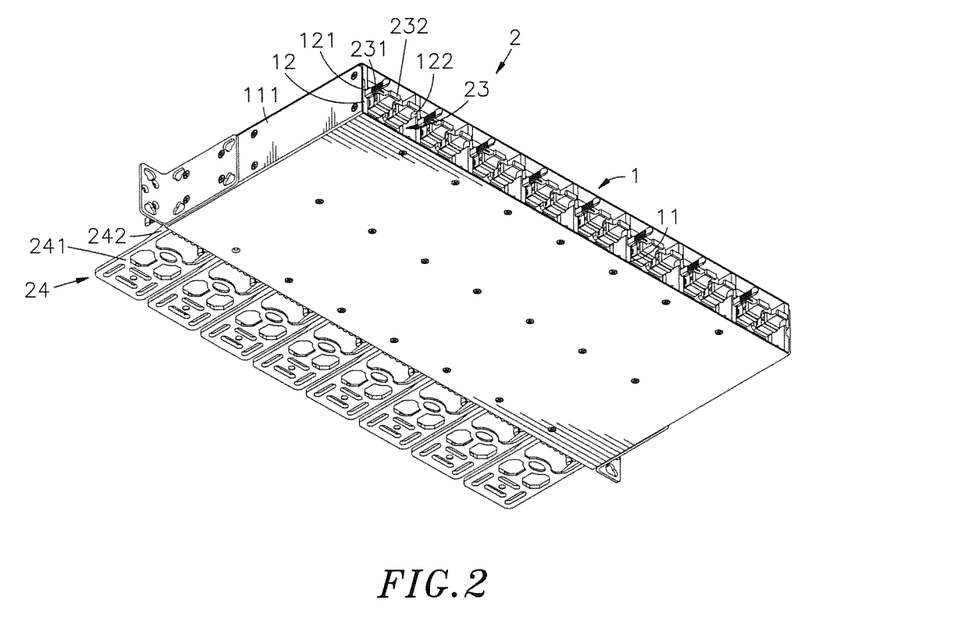
FIG. 2 is an oblique rear elevational view of the optical fiber module rack system in accordance with the present invention.
Figure 3:
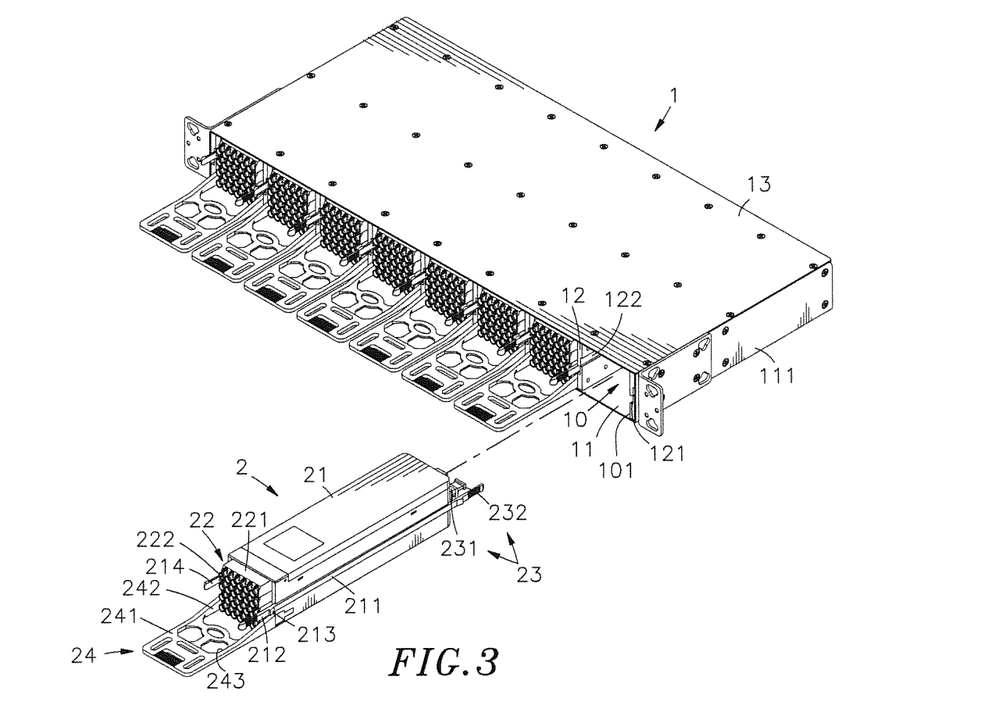
FIG. 3 is an exploded view of the fiber module rack system in accordance with the present invention.
Figure 4:
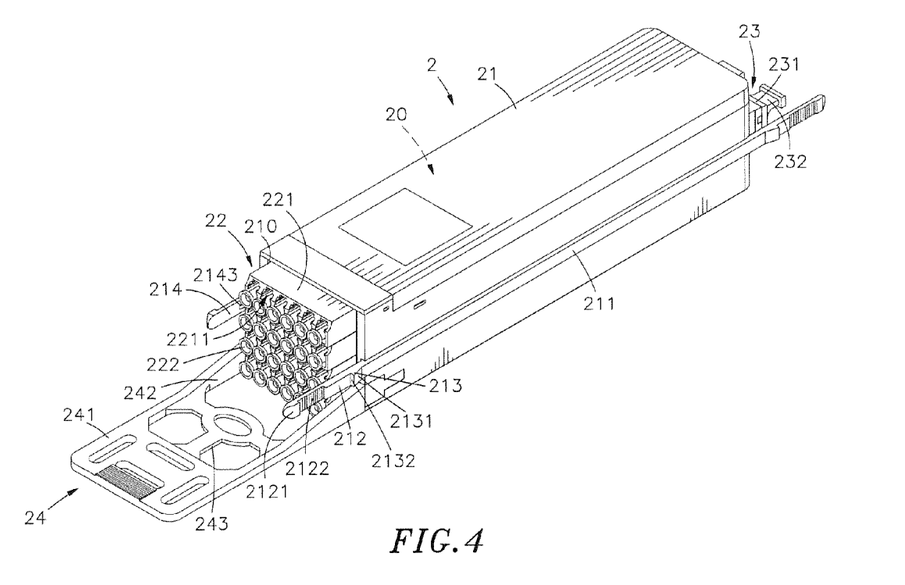
FIG. 4 is an oblique top elevational view of one optical fiber storage box of the optical fiber module rack system in accordance with the present invention.
Figure 5:
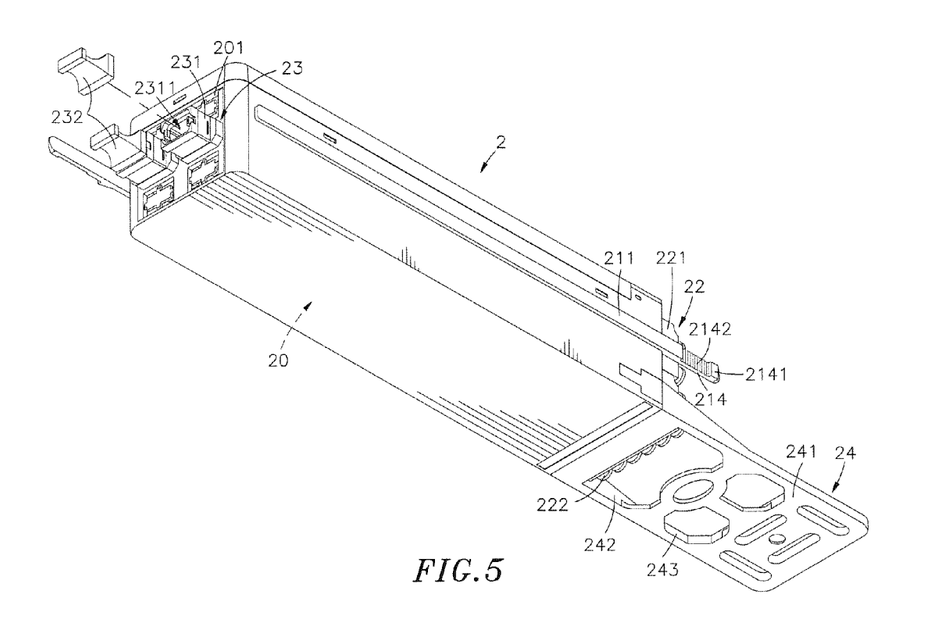
FIG. 5 is an oblique bottom elevational view of one optical fiber storage box of the fiber module rack system in accordance with the present invention.
Figure 6:
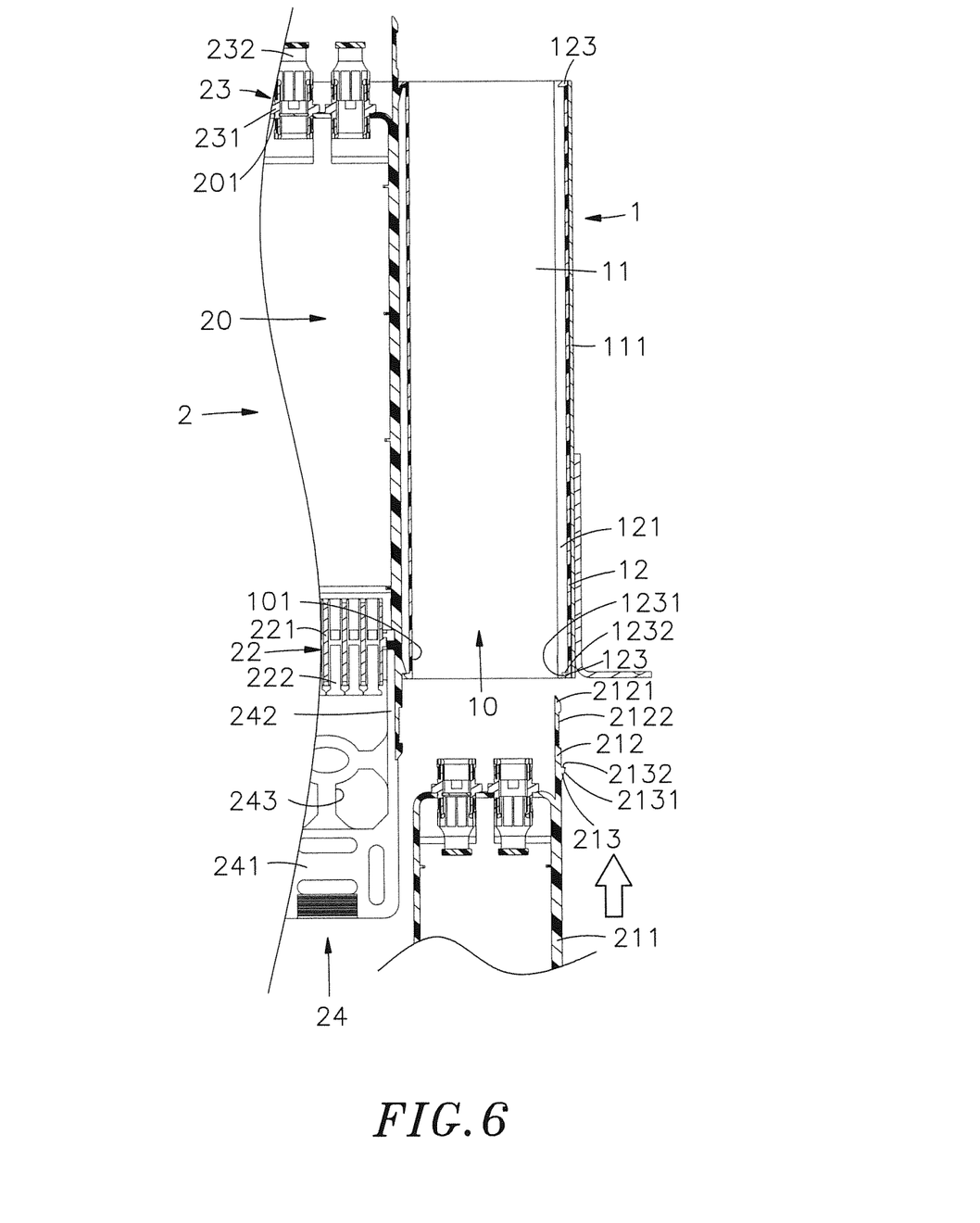
FIG. 6 is a schematic sectional top view of the present invention illustrating the relationship between each optical fiber storage box and the respective accommodation chamber of the rack before insertion.
Figure 7:
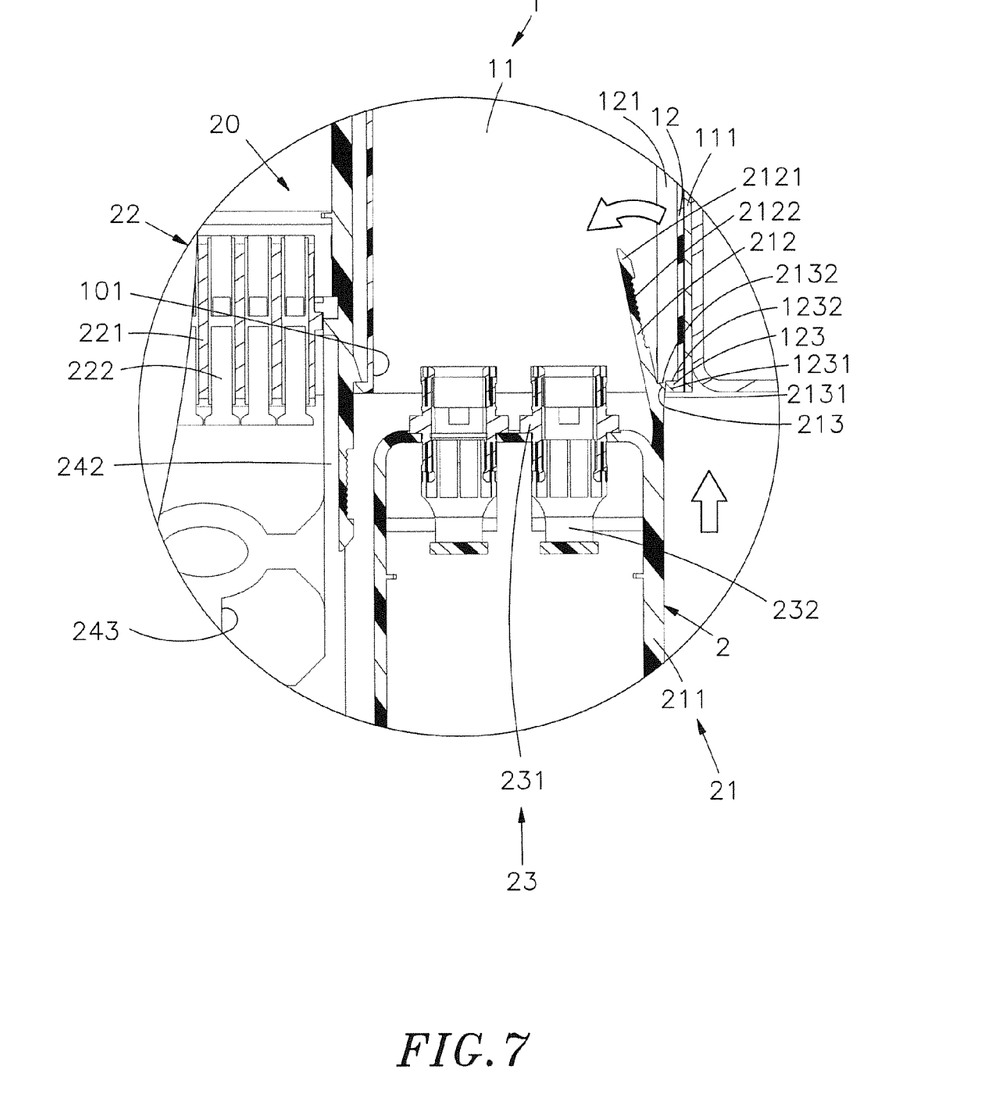
FIG. 7 corresponds to FIG. 6, illustrating the optical fiber storage box inserted into the respective accommodation chamber of the rack before insertion (I).
Figure 8:
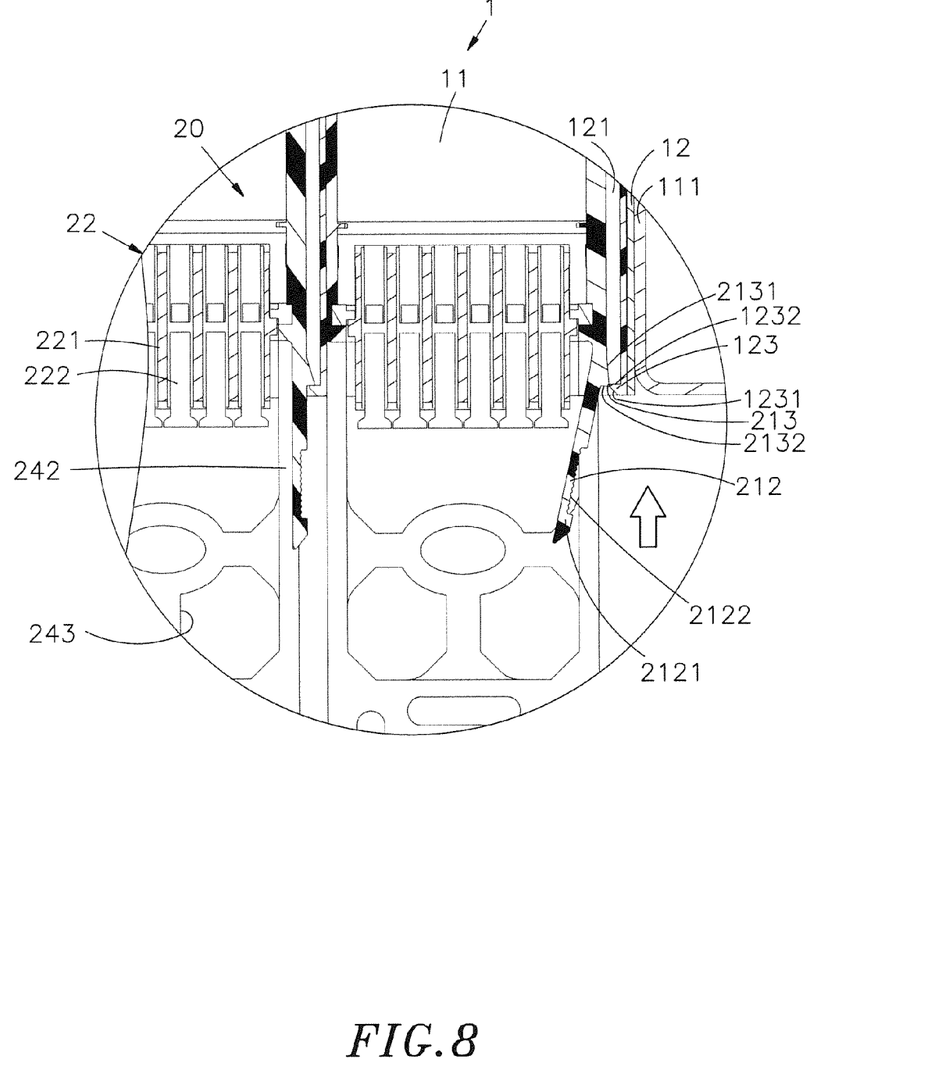
FIG. 8 corresponds to FIG. 6, illustrating the optical fiber storage box inserted into the respective accommodation chamber of the rack before insertion (II).
Figure 9:
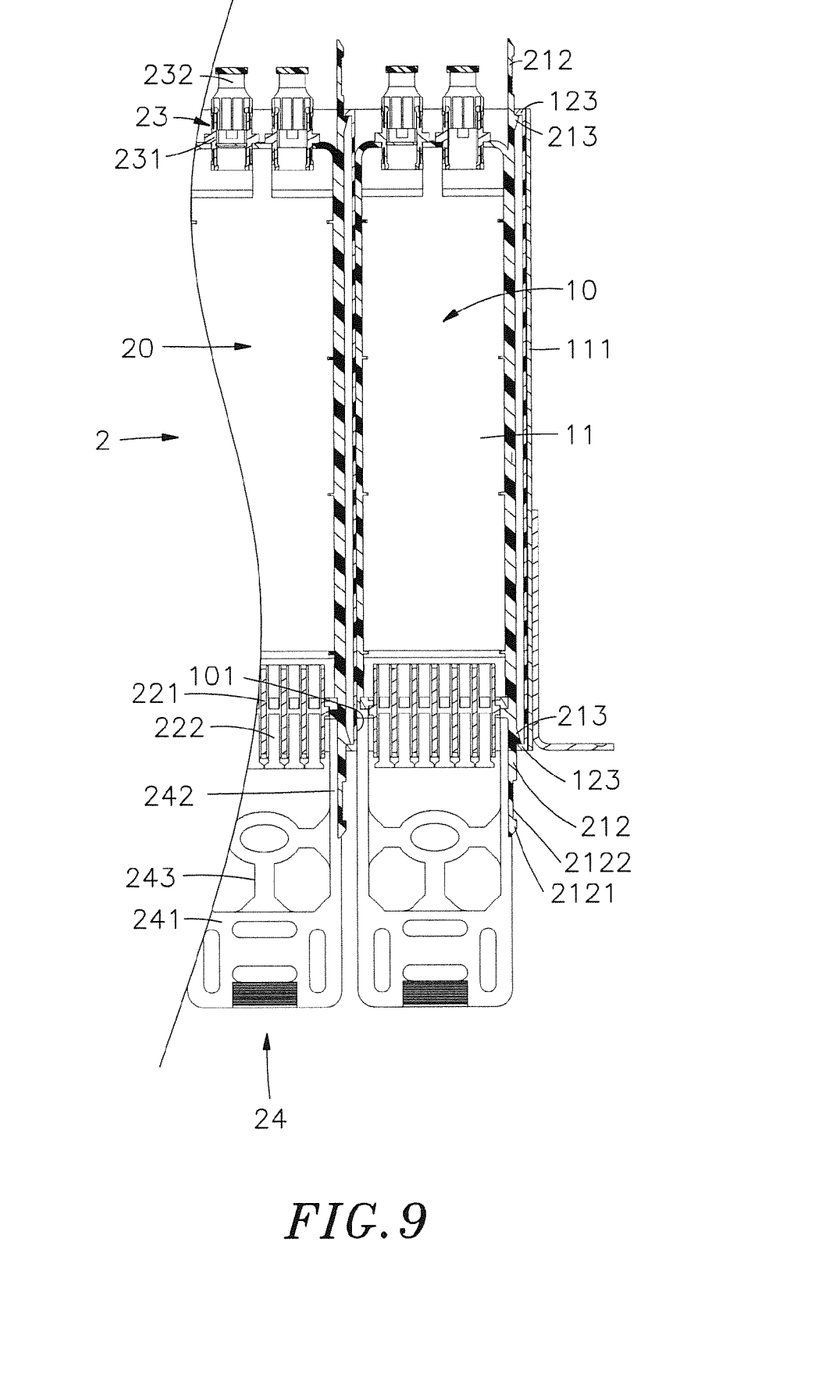
FIG. 9 corresponds to FIG. 6, illustrating the optical fiber storage box inserted into the respective accommodation chamber of the rack before insertion (III).

Further, the first optical fiber module 22 of the optical fiber storage box 2 comprises a plurality of first sockets 221, each first socket 221 defining therein a row of parallel mating connection holes 2211, and a dust boot 222 detachably mounted in each mating connection hole 2211. The second optical fiber module 23 of the optical fiber storage box 2 comprises a plurality of second sockets 231 of different design relative to the first sockets 221. Each second socket 231 comprises a mating connection hole 2311 extending through two opposite ends thereof, and a dust boot 232 detachably mounted in the mating connection hole 2311. Each optical fiber storage box 2 further comprises a pull handle 24 forwardly extended from a front bottom side of the hollow box body 21 thereof. The pull handle 24 comprises a handle body 241, two extension arms 242 respectively extended from two opposite lateral sides of the handle body 241 and terminated in the hollow box body 21, and a plurality of finger hole (or tag hole) 243 cut through opposing top and bottom surfaces of the handle body 241.

In the present preferred embodiment, the partition plates 12 divide the internal space of the rack 1 into 8 accommodation chambers 10 for accommodating 8 pcs of optical fiber storage boxes 2; the first optical fiber module 22 of the optical fiber storage box 2 comprises 4 pcs of first sockets 221 arranged in a stack; each first socket 221 comprises 6 mating connection holes 2211 horizontally arranged in parallel; the second optical fiber module 23 of the optical fiber storage box 2 comprises 4 pcs of second sockets 231 transversely and longitudinally aligned; each second socket 231 defines therein the mating connection hole 2311; the multiple optical fiber leads (not shown) in the storage chamber 20 of the hollow box body 21 are respectively plugged into the mating connection holes 2211 of the first sockets 221 and the mating connection holes 2211 of the second sockets 231 to achieve pre-connection of the optical fiber storage box 2 so that two second sockets 231 (such as MPO connectors) are converted into four first sockets 221 (such as LC or SC connectors); thus, the multiple first sockets 221 of the first optical fiber module 22 are adapted for the connection of 24 single-core LC or SC optical fiber connectors, enabling two second sockets 231 of the second optical fiber module 23 to be provided for the connection of a 12-core MPO optical fiber connector; the 8 pcs of optical fiber storage boxes 2 are respectively mounted in the respective accommodation chambers 10 of the rack 1 to meet the 1RU rack specifications for the connection of LC or SC optical fiber connectors of total 192 cores and the first socket 221 of the first optical fiber module 22. However, it is to be noted that the structural arrangement, type and quantity of the first sockets 221 of the first optical fiber module 22 and the second sockets 231 of the second optical fiber module 23 described above are for the purpose of illustration only but not intended for use to limit the scope and spirit of the invention. Under the condition of meeting the specifications of 1RU rack, the optical fiber storage box 2 allows installation of multiple optical fiber connectors at a relatively higher density.

Referring also to FIGS. 6-9, in installation, insert each optical fiber storage box 2 horizontally into one respective accommodation chamber 10 of the rack 1 to abut the hook block 213 of the hollow box body 21 against the stop block 123 of one respective partition plate 12. At this time, the stepped engagement surface 2132 of the hook block 213 will be forced by the beveled outer guide surface 1231 of the stop block 123, causing the associating elastic retainer strip 212 to deform elastically and inwardly so that the hook block 213 can be moved over the stop block 123. After movement of the hook block 213 over the stop block 123, the elastic retainer strip 212 immediately returns to its former shape subject to the effect of its elastic material property, and then the guide rails 211 at the two opposite lateral sides of the hollow box body 21 are respectively inserted into one respective first sliding groove 121 and one respective second sliding groove 122. Subject to the guiding and position-limiting effects of the arrangement between the guide rails 211 and the respective first sliding groove 121 and second sliding groove 122, the optical fiber storage box 2 is smoothly positioned in the respective accommodation chamber 10 inside the rack 1.

When inserting one optical fiber storage box 2 into one respective accommodation chamber 10 inside the rack 1, the hook block 213 at the elastic retainer strip 212 at the front side of the hollow box body 21 is forced against one respective stop block 123 at one partition plate 12, causing the beveled pushing surface 2131 to be forced by the beveled outer guide surface 1231 of the stop block 123, and thus, the elastic retainer strip 212 is elastically deformed for enabling the hook block 213 to be moved over the stop block 123. After the hook block 213 moved over the stop block 123, the optical fiber storage box 2 moved into position. At this time, the hook blocks 213 at the two elastic retainer strips 212 at the opposing front and rear ends of the respective guide rail 211 are forced into the first sliding groove 121 at the respective partition plate 12, and the stepped engagement surfaces 2132 of the hook blocks 213 are respectively engaged with the stepped inner abutment surfaces 1 232 of the respective s top blocks 123 at the opposing front and rear ends of the first sliding groove 121 to prohibit the optical fiber storage box 2 from forward-backward displacement. After installation, the first optical fiber module 22 and the second optical fiber module 23 are exposed out of the openings 101 of the opposing front and rear sides of the respective accommodation chamber 10 of the rack 1.

Figure 10:
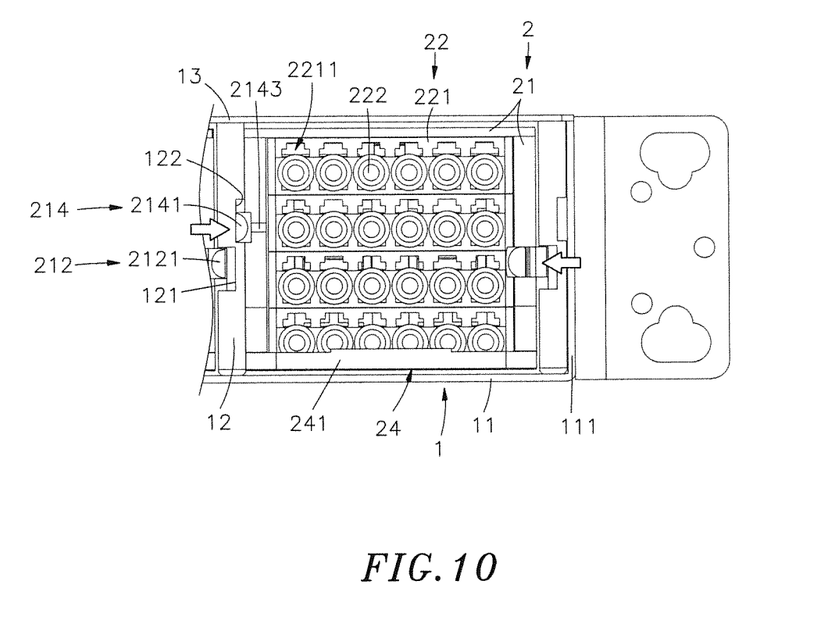
FIG. 10 is a schematic sectional view of a part of the present invention, illustrating removal of the optical fiber storage box out of the respective accommodation chamber of the rack (I).
Figure 11:
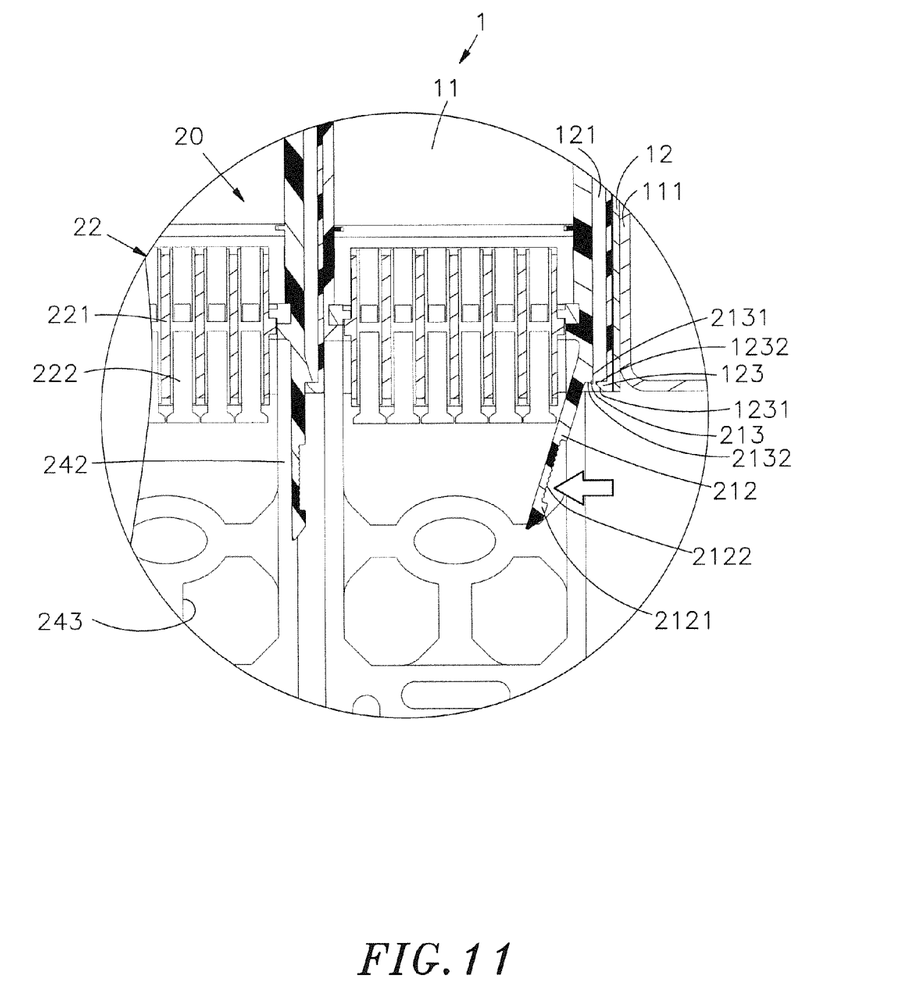
FIG. 11 is a schematic sectional view of a part of the present invention, illustrating removal of the optical fiber storage box out of the respective accommodation chamber of the rack (II).
Figure 12:
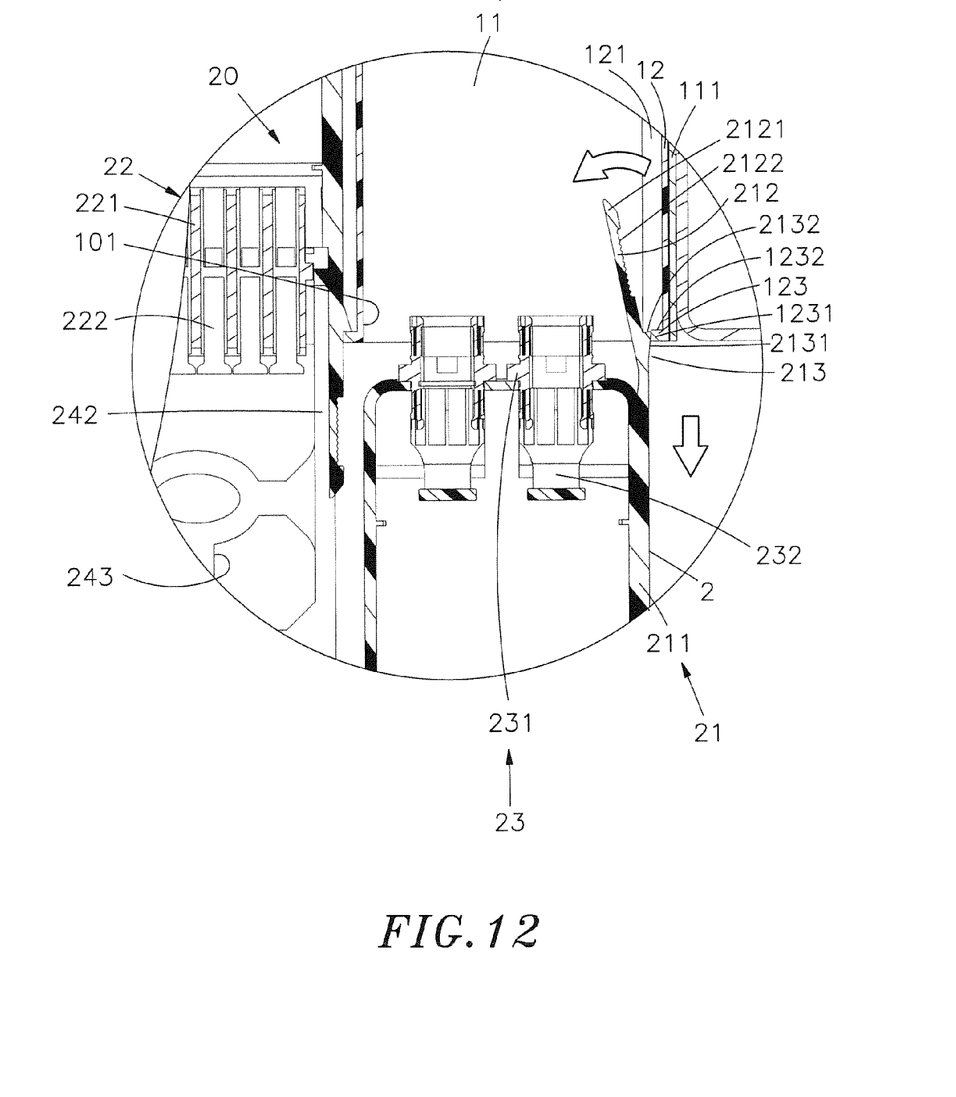
FIG. 12 is a schematic sectional view of a part of the present invention, illustrating removal of the optical fiber storage box out of the respective accommodation chamber of the rack (III).

Referring to FIGS. 10-12, when the user wishes to pull one optical fiber storage box 2 out of the respective accommodation chamber 10 of the rack 1, the user can press the conical finger tips 2121;2141 of the elastic retainer strip 212 and elongated press member 214 at the front side of the hollow box body 21 with one single hand to force the elastic retainer strip 212 toward the elongated press member 214, thereby disengaging the respective hook blocks 213 from the respective stop blocks 123 at the front side of the respective partition plates 12, and then pull the handle body 241 or finger hole 243 of the pull handle 24 with the other hand to carry the hollow box body 21 and the two guide rails 211 out of the mating first sliding groove 121 and second sliding groove 122. Because the elastic retainer strip 212 and the elongated press member 214 are bilaterally disposed at the front side of the hollow box body 21 at different elevations, the elastic retainer strip 212 is prohibited from interfering or tangling with the elongated press member 214 of the adjacent optical fiber storage box 2. Further, because the length of the elongated press member 214 is shorter than the length of the elastic retainer strip 212, pressing the elastic retainer strip 212 is free from interference of the elongated press member 214 of the adjacent optical fiber storage box 2. Further, the structural design of the anti-slip grooves 2 122;2142 enables the conical finger tips 2121;2141 of the elastic retainer strip 212 and elongated press member 214 to be pressed positively.

When moving one optical fiber storage box 2 out of the respective accommodation chamber 10, the hook block 213 at the elastic retainer strip 212 at the back side of the hollow box body 21 is abutted against the stop block 123 at the respective partition plate 12, causing the stepped engagement surface 2132 to be forced by the stepped inner abutment surface 1232 of the respective stop block 123, and thus, the elastic retainer strip 212 is elastically deformed for allowing movement of the hook block 213 over the respective stop block 123 and removal of the optical fiber storage box 2 from the respective accommodation chamber 10 of the rack 1. Thus, the multiple optical fiber storage boxes 2 can be conveniently and detachably mounted in the rack 1 without screws, saving the installation labor and time, assuring a high level of structural stability, facilitating maintenance and replacement and improving product competitiveness.

In conclusion, the invention provides an optical fiber module rack system, which comprises a rack 1 comprising a base panel 11, a plurality of partition plates 12 arranged on the base panel 11 in a parallel manner, a plurality of accommodation chambers 10 defined within the base panel 11 and separated by the partition plates 12 and a first sliding groove 121 and a second sliding groove 122 bilaterally disposed in each accommodation chamber 10, and a plurality of optical fiber storage boxes 2 respectively mounted in the accommodation chambers 10 of the rack 1, wherein each optical fiber storage box 2 comprises a hollow box body 21 inserted into one respective accommodation chamber 10, two guide rails 211 respectively located at two opposite lateral sidewalls of the hollow box body 21 and respectively coupled to the first sliding groove 121 and the second sliding groove 122 in the respective accommodation chamber 10, two elastic retainer strips 212 respectively extended from the opposing front and rear ends of one guide rail 211 and respectively provided with a hook block 213 for engagement with respective stop blocks 123 at the front and rear ends of the first sliding groove 121, and an elongated press member 214 extended from the front end of the other guide rail 211. When the user wishes to remove one optical fiber storage box 2 from the respective accommodation chamber 10 of the rack 1, press the elastic retainer strips 212 and the elongated press member 214 to disengage the respective hook blocks 213 from the respective stop blocks 123, allowing removal of the optical fiber storage box 2 out of the respective accommodation chamber 10 of the rack 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An optical fiber module rack system, comprising:
a rack comprising a base panel, a plurality of partition plates arranged on said base panel, a plurality of accommodation chambers defined within said base panel and separated from one another by said partition plates, each said accommodation chamber defining an opening located in each of opposing front and rear sides thereof, a first sliding groove and a second sliding groove respectively disposed at two opposite sidewalls of each said accommodation chamber and extended to the openings in the front and rear sides of the associating said accommodation chamber, and a stop block located at each of opposing front and rear ends of each said first sliding groove;
a plurality of optical fiber storage boxes respectively mounted in said accommodation chambers of said rack, each said optical fiber storage box comprising a hollow box body, a first optical fiber module mounted in a front side of said hollow box body for the connection of predetermined mating optical fiber connectors, a second optical fiber module mounted in an opposing rear side of said hollow box body and connected to said first optical fiber module for the connection of predetermined mating optical fiber connectors, two guide rails respectively located at two opposite sidewalls of said hollow box body at different elevations and respectively inserted into one respective said first sliding groove and one respective said second sliding groove in one said accommodation chamber of said rack, two elastic retainer strips respectively outwardly extended from opposing front and rear ends of one said guide rail, two hook blocks respectively located at said elastic retainer strips adjacent to the associating said guide rail at an outer side for engagement with one respective said stop block of said rack, and an elongated press member outwardly extended from a front end of the other said guide rail for pressing by an external force to disengage said hook blocks from the respective said stop blocks for allowing removal of the respective said optical fiber storage box from the respective said accommodation chamber of said rack.

2. The optical fiber module rack system as claimed in claim 1, wherein said rack further comprises two upright side panels respectively extended from two opposite lateral sides of said base panel, and a cover panel supported on said partition plates and fixedly fastened to said upright side panels.

3. The optical fiber module rack system as claimed in claim 1, wherein said first sliding groove and said second sliding groove are respectively disposed at two opposite sidewalls of each said accommodation chamber at different elevations rack; said guide rails of each said optical fiber storage box are located at the two opposite lateral sidewalls of the associating said hollow box body at different elevations and respectively inserted into said first sliding groove and said second sliding groove in the respective said accommodation chamber so that the elongated press member of each said optical fiber storage box and the adjacent elastic retainer strip of one adjacent said optical fiber storage box are kept at different elevations.

4. The optical fiber module rack system as claimed in claim 1, wherein each said stop block of said rack defines a beveled outer guide surface at an outer side and a stepped inner abutment surface at an inner side.

5. The fiber module rack system as claimed in claim 1, wherein each said optical fiber storage box further comprises a storage chamber defined in the hollow box body thereof storage chamber; said first optical fiber module and said second optical fiber module are respectively mounted in the front and rear sides of said hollow box body and exposed out of the respective openings in the opposing front and rear sides of the respective said accommodation chamber of said rack, said first optical fiber module comprising a plurality of first sockets, said second optical fiber module comprising a plurality of second sockets of different designs relative to said first sockets.

6. The optical fiber module rack system as claimed in claim 1, wherein each said elastic retainer strip of each said optical fiber storage box comprises a conical finger tip at a distal end thereof and a plurality of wave-shaped anti-slip grooves located at an outer side thereof adjacent to said conical finger tip.

7. The optical fiber module rack system as claimed in claim 1, wherein each said hook block defines a beveled pushing surface that slopes downwardly inwards toward the associating said guide rail and a stepped engagement surface disposed opposite to s aid beveled pushing surface of the respective said hook block.

8. The optical fiber module rack system as claimed in claim 1, wherein the length of said elongated press member of each said optical fiber storage box is shorter than said elastic retainer strips, said elongated press member comprising a conical finger tip located at a distal end thereof, a plurality of wave-shaped anti-slip grooves located at an outer side thereof adjacent to said conical finger tip, and a reinforcing rib located at an inner side thereof and horizontally extended to the associating said hollow box body.

9. The optical fiber module rack system as claimed in claim 1, wherein said first optical fiber module of each said optical fiber storage box comprises a plurality of first sockets, each said first socket defining therein a row of parallel mating connection holes, said first sockets being selectively LC or SC connectors for the connection of single-core LC or SC optical fiber connectors.

10. The optical fiber module rack system as claimed in claim 1, wherein said second optical fiber module of each said optical fiber storage box comprises a plurality of second sockets, each said second socket comprising a mating connection hole extending through two opposite ends thereof, said second sockets being MPO connectors for the connection of 12-core MPO optical fiber connectors.

11. The optical fiber module rack system as claimed in claim 1, wherein each said optical fiber storage box further comprises a pull handle forwardly extended from a front bottom side of the hollow box body thereof, said pull handle comprising a handle body, two extension arms respectively extended from two opposite lateral sides of said handle body and terminated in the associating said hollow box body.

12. The optical fiber module rack system as claimed in claim 1, wherein the number of said accommodation chambers of said rack and the number of said optical fiber storage boxes are 8, and the first optical fiber modules and second optical fiber modules of the total 8 pcs of said optical fiber storage boxes are connected for the connection of total 192 cores of LC or SC optical fiber connectors.

* * * * *